(12) United States Patent
Hayden

(10) Patent No.: US 6,696,030 B1
(45) Date of Patent: Feb. 24, 2004

(54) METHOD FOR REDUCING THE CHEMICAL CONVERSION OF OXIDIZABLE OR DISPROPORTIONABLE COMPOUNDS CONTACTING CARBONACEOUS CHARS

(75) Inventor: Richard A. Hayden, Pittsburgh, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

(21) Appl. No.: 09/079,021

(22) Filed: May 14, 1998

(51) Int. Cl.⁷ ................................................ B01D 53/38

(52) U.S. Cl. ........................ 423/210; 423/659; 210/763

(58) Field of Search ................................ 423/460, 210, 423/659; 95/901, 903; 502/425, 426, 29; 210/763

(56) References Cited

U.S. PATENT DOCUMENTS

| | | | | |
|---|---|---|---|---|
| 4,199,872 A | * | 4/1980 | Bischoff | .................... 34/79 |
| 4,495,165 A | * | 1/1985 | Gurza | .................... 423/326 |
| 4,708,853 A | * | 11/1987 | Matviya et al. | ............. 423/210 |
| 5,013,698 A | * | 5/1991 | Lonsinger et al. | ............ 502/27 |

* cited by examiner

*Primary Examiner*—Stuart L. Hendrickson
(74) *Attorney, Agent, or Firm*—Cohen & Grigsby, P.C.

(57) ABSTRACT

A method is provided for reducing the chemical conversion of oxidizable or disproportionable compounds contained in liquid or gaseous process media which contact carbonaceous chars. In this method the carbonaceous char contacting the oxidizable or disproportionable compounds is first treated with a non-nitrogen-containing Bronsted acid. The acid-treated char is then heated to temperatures greater than 750° C. In this manner the inherent catalytic reactivity of the carbon in the char is reduced effectively and largely irreversibly.

12 Claims, No Drawings

METHOD FOR REDUCING THE CHEMICAL CONVERSION OF OXIDIZABLE OR DISPROPORTIONABLE COMPOUNDS CONTACTING CARBONACEOUS CHARS

FIELD OF THE INVENTION

The present invention relates to a method for reducing the chemical conversion of oxidizable or disproportionable materials contacting carbonaceous chars.

BACKGROUND OF THE INVENTION

It is well-known that certain oxidizable or disproportionable compounds contacting carbonaceous chars such as charcoals and activated carbons can be chemically decomposed or converted into other chemical entities. Some examples of these types of chemical conversions include the conversion of hydrogen sulfide, sulfur dioxide, phosphine, arsenite, nitrite, and iron(II), in the presence of $O_2$ and $H_2O$, into other oxidized species such as sulfur, sulfuric acid, phosphoric acid, arsenate, nitrate, and iron(III), respectively. Organic compounds may be similarly affected. For example, the oxidation of ascorbic acid, hydroquinone, and oxalic acid in contact with a carbonaceous char have also been reported. In some cases, disproportionation, or autoxidation/reduction, of the compound may occur upon contact with the char. Such reactions are typical for compounds such as hydrogen peroxide, hydrazine, and monochloramine.

Carbonaceous chars such as activated carbons, especially those produced at high temperatures (i.e., above 700° C.), often possess catalytic properties which facilitate the chemical conversion of such materials. The origins of this catalytic activity can usually be attributed to two principal factors: (1) the inorganic non-carbon ash constituents of the char, e.g. iron, potassium, and calcium, and (2) the inherent catalytic properties of the carbon itself. If the char is used for the physical adsorption, removal, and/or recovery of substances from gas or liquid media, the presence of catalytic reactivity in the char may lead to an unwanted chemical conversion of compounds in the process media into materials that contaminate the final process stream or that interfere with the physical adsorption process. Moreover, the reactions which lead to catalytic chemical conversion are often highly exothermic, increasing the likelihood of ignition of the char itself.

Examples of processes in which the catalytic activity of the char is a liability include the purification of disproportionable or oxidizable substances such as hydrogen peroxide and organic glycols, respectively, and the adsorption, recovery, and re-use of oxidizable solvents such as acetone and methyl ethyl ketone. In these types of applications, the primary component of the process stream is itself a material which can become reactive if catalyzed by the carbon under certain conditions. In other applications it may be desirable to preserve a reactive constituent of the process stream, e.g. hydrogen peroxide, such that it is available for reaction with species other than the carbon itself. Less obvious is the need for a non-catalytic, adsorptive carbon for applications in which the potentially reactive component is an interference, constituting only a small part of the overall adsorbate loading. For example, in streams containing small concentrations of an oxidizable material such as hydrogen sulfide and much higher concentrations of an adsorbable, recoverable organic, it is possible that the oxidation of the hydrogen sulfide, which is only weakly physically adsorbed per se, can cause a build-up over time of highly adsorbable and polar reaction products, such as sulfuric acid, which can greatly interfere with the adsorption of the organic components of the stream. If the inherently reactive carbon catalytic sites can be deactivated, more effective use can be made of the physical adsorption properties of the carbon for the removal and recovery of the organic stream components.

A number of prior art methods used to reduce the catalytic activity of materials in contact with carbonaceous chars have been directed to the addition of chemical agents to the process media or changes in the process conditions. For example, it is known to reduce the disproportionation of hydrogen peroxide in contact with a carbonaceous char by lowering the pH of the process stream. Other prior art methods to reduce the chemical conversion of materials in contact with the char address the removal of catalytically-active ash constituents from the char. For example, it is known to remove acid-soluble ash constituents by acid-washing the char. After treatment, the char is rinsed with water and/or an aqueous solution of a base to remove and/or neutralize the acid. Hydrofluoric acid solution, an extremely hazardous material, has been found to be particularly effective for removing such ash components. Ash reductions up to or exceeding an order of magnitude are usually achievable by these methods. Other ash removal processes treat the char first with caustic solution to remove caustic-soluble components, followed by the aforementioned acid extraction treatment to remove the remaining acid-soluble components.

In other embodiments of the prior art, the ash components are treated with agents such as silanes to reduce their catalytic reactivity without removing them from the carbon surface. In all of these prior art methods, however, little regard has been given to the inherent reactivity of the carbon itself, which alone may be sufficient to interfere with the intended function of the char.

Where the reactivity of the carbon has been considered, no methods have been identified or reported which can deactivate the carbon effectively and largely irreversibly. For example, it has been observed that oxygen can chemisorb to the carbon surface and cause the carbon to become less catalytically active. However, after use, and upon high-temperature thermal treatment of the char to remove other adsorbed materials, it is found that the oxygen is also lost from the carbon. Upon removal of the oxygen, the inherent catalytic reactivity of the carbon once again becomes manifest, requiring additional post-treatment of the thermally-treated char to deactivate the carbon prior to re-use. Therefore, the oxygen appears to have merely masked, and not destroyed, the catalytic activity of the carbon.

Accordingly, it is the object of the present invention to provide a method which reduces the chemical conversion of oxidizable or disproportionable materials contacting carbonaceous chars in liquid or gaseous process media by reducing the inherent catalytic activity of the carbon itself. It is further the object of the present invention to provide this reduction of chemical conversion without the addition of chemical agents to the process media or changes in the process conditions. Additionally, it is the object of the present invention to provide a method for the deactivation of the carbon in so that the deactivation is largely irreversible upon high-temperature thermal treatment of the char.

SUMMARY OF THE INVENTION

Generally, the present invention comprises a method for reducing the chemical conversion of oxidizable or disproportionable materials in liquid or vapor process media which contact a carbonaceous char. The process does not involve the addition of deactivating agents to the liquid or vapor media. In the present invention the nature of the carbonaceous char is altered such that the inherent reactivity of the carbon itself is eliminated or greatly reduced.

The present invention provides contacting the carbonaceous char with a non-nitrogen-containing Bronsted acid, such as hydrochloric acid, at temperatures at or below the boiling point of the acid or aqueous acid solution and thereafter heating the treated char to temperatures above 750° C. Nitrogen-containing acids such as nitric-acid-are not generally preferred in the present invention since treatment by such acids is known to increase the catalytic activity of carbonaceous chars. The amounts of acid used in the present invention are such that the char contains preferably 1–10 millimoles of acid per mole of carbon prior to raising the temperature of the acid-containing carbon to or above 750° C. In addition it may also be desirable to reduce any non-carbon contributions to the overall reactivity of the char, but is not necessary for those applications requiring only the deactivation of the carbon itself. If the char is rinsed with water following acid treatment, the rinse is carried out such that the pH of the rinse water is less than 5 to ensure that sufficient acid hydrogen is present on the char to accomplish the required deactivation of the catalytic carbon sites upon raising the temperature.

Upon exposure of the acid-treated char to temperatures at or above 750° C., the deactivation of the carbon reactivity is largely effected. The heating of the acid-treated carbon is carried out preferably in an inert or oxygen-free atmosphere, while the cooling of the deactivated char to ambient temperatures may be carried out in an oxygen-containing atmosphere to impart additional deactivation properties to the char according to the methods of known prior art. "Such oxygen-containing atmosphere may include any oxidant containing oxygen, phosphorus, sulfur, or a halogen."

Other prior art methods for deactivating other reactive elements of the char may also be used in combination with the method of the present invention to impart still other desirable properties to the deactivated char. For example, for chars containing high levels of inorganic ash constituents, the ash components may be removed with base and/or acid after, as well as prior to, application of the method of the present invention.

The method of the present invention may be repeated any number of times with the same char to achieve additional levels of deactivation. However, for chars with comparatively low levels of initial inherent carbon reactivity, a single application of the method is generally sufficient to achieve acceptable reductions in carbon reactivity and, therefore, significant reductions in the amount of decomposition or chemical conversion of materials which come into contact with the carbon. Other advantages of the present invention will become apparent from a perusal of the following detailed description of presently preferred embodiments of the invention.

PRESENTLY PREFERRED EMBODIMENTS

The following examples illustrate presently preferred embodiments of the invention. In these examples, a peroxide decomposition reaction is used as the primary measure of the catalytic activity of the carbon as well as a specific example of the reduction in catalytic activity by the method of the present invention for a char in contact with a disproportionable material. One char chosen for treatment by the method of the present invention is a Centaur carbon. Centaur carbon is a commercially available activated carbon which has been treated during manufacture to greatly enhance its inherent catalytic activity. Accordingly, the relative effects of the deactivation treatment of the present invention can be followed more conveniently in the laboratory. Commercial practice of the invention, however, will generally involve the deactivation of chars which are not first treated to enhance the inherent catalytic activity of the carbon.

Example 1 is an embodiment of the present invention wherein a Centaur activated carbon, deactivated by impregnation with a strong mineral acid according to the method of the present invention, is compared to a replicate control impregnated only with water. In this example it is seen that the present invention provides significant reductions in catalytic activity (higher t-¾ times) without significant changes in the ash content of the char.

Example 2 is a prior art extraction of the Centaur HSV carbon with a strong mineral acid carried out to remove ash components from the carbon. The carbon is then water-rinsed, or first base-neutralized and then water-rinsed, to remove the acid from the carbon prior to heating to temperatures above 750° C. In this example it is seen that significant reductions in the ash content of the char by the methods of the prior art provide virtually no reduction in the catalytic activity of the carbon for hydrogen peroxide disproportionation.

Comparison of the results of Example 2 with those of Example 1 shows that the deactivation of hydrogen peroxide disproportionation by the method of the present invention is dependent primarily upon the presence of the acid contacting the carbon as the temperature is increased to above 750° C. during the preparation of the carbon, and not upon the removal of ash from the carbon as taught by the methods of the prior art.

Example 3 is a prior art deactivation wherein oxygen is chemisorbed to the carbon surface to provide a measure of deactivation with respect to hydrogen peroxide disproportionation. However, after heating the oxidized carbon to temperatures above 750° C., it is seen that the disproportionation of the peroxide is greatly increased.

Comparison of the results of Example 3 with those of Example 1 shows that the deactivation afforded by the present invention is enabled and made largely irreversible by heating to temperatures above 750° C., while in the prior art method the deactivation is largely reversible and is mostly destroyed by heating to temperatures above 750° C.

Example 4 is an embodiment of the present invention wherein the catalytic activity of a Centaur carbon is reduced for the oxidation of hydrogen sulfide in gaseous media.

Example 5 is an embodiment of the present invention wherein the catalytic activity of a Centaur carbon is reduced for the oxidation of sulfur dioxide in gaseous media.

Example 6 is a preferred embodiment of the present invention wherein the catalytic activity of BCP carbon, a commercially-available bituminous coal-based activated carbon which is not initially treated to enhance the inherent carbon catalytic activity, is reduced for the disproportionation of hydrogen peroxide in liquid media.

Example 1. A 50.0 gram sample of Centaur HSV carbon, as received, was impregnated with 15 mL of distilled, deionized water. The impregnated carbon was then allowed to stand in a closed container for approximately 2 hours. At the end of this time period, the impregnated carbon was oven-dried at about 150° C. overnight, and subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.) and for t-¾ time by the method described in Example 1 of U.S. Pat. No. 5,470,748.

For this carbon sample, the ash content measured 4.0 wt % and the t-¾ time measured 12.1 minutes.

To demonstrate the method of the present invention, a replicate 50.0 gram sample of Centaur HSV carbon, as received, was impregnated with 15 mL of 1:1 hydrochloric acid solution (approximately 6 N). The impregnated carbon was then allowed to stand in a closed container for approximately 2 hours. At the end of this time period, the impregnated carbon was oven-dried at about 150° C. overnight, and subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.), and for t-¾ time by the method described in Example 1 of U.S. Pat. No. 5,470,748.

For this carbon sample, the ash content measured 3.7 wt % and the t-¾ time measured 72.6 minutes.

Example 2. A 63.8 gram sample of the Centaur HSV carbon used in Example 1, as received, was Soxhlet-extracted for about 24 hours with 1:1 hydrochloric acid solution (approximately 6 N). After extraction, the carbon was transferred to a glass column and rinsed upflow with deionized water at a rate of about 100 mL per minute (about 1 bed volume per minute) for roughly 7 days. At the end of this time period, the carbon was transferred to a beaker and dried in an oven overnight at about 150° C. After oven-drying, the carbon was subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.), and for t-¾ time by the method described in Example 1 of U.S. Pat. No. 5,470,748.

For this carbon sample, the ash content measured 2.8 wt % and the t-¾ time measured 13.7 minutes.

A replicate 63.8 gram sample of the Centaur HSV carbon, as received, was also Soxhlet-extracted for about 24 hours with 1:1 hydrochloric acid solution (approximately 6 N). After extraction, the carbon was transferred to a beaker containing about 100 mL of distilled deionized water and titrated with aqueous sodium hydroxide solution such that the pH of the solution in contact with the carbon, upon standing for about 24 hours, was greater than 5. The base-neutralized carbon was then transferred to a glass column and rinsed upflow with deionized water at a rate of about 100 mL per minute (about 1 bed volume per minute) for roughly 7 days. At the end of this time period, the carbon was transferred to a beaker and dried in an oven overnight at about 150° C. After oven-drying, the carbon was subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.), and for t-¾ time by the method described in Example 1 of U.S. Pat. No. 5,470,748.

For this carbon sample, the ash content measured 2.7 wt % and the t-¾ time measured 13.2 minutes.

Example 3. A 50.0 gram sample of the Centaur HSV carbon used in Example 1, as received, was heated in a flowing air stream in a rotary kiln for about 30 minutes at about 425 C. After this treatment the resultant oxidized carbon was cooled to ambient temperature in air and tested for t-¾ time by the method described in Example 1 of U.S. Pat. No. 5,470,748. For this carbon sample, the t-¾ time measured 40.0 minutes.

Approximately 40 grams of the oxidized carbon were then returned to the rotary kiln and heated in a flowing nitrogen stream for about 30 minutes at approximately 925° C. After this treatment the resultant carbon was cooled to ambient temperature under a nitrogen atmosphere and tested for t-¾ time by the method described in Example 1 of U.S. Pat. No. 5,470,748. For this carbon sample, the t-¾ time measured 14.4 minutes.

Example 4. Two replicate twenty-five gram samples were prepared from an 8×30 mesh (U.S. Standard Series Sieves) Centaur activated carbon (Calgon Carbon Corporation, Pittsburgh, Pa.). Both samples were oven-dried, as received, in air at about 150° C. for about 24 hours, and then cooled in air to ambient temperature, to remove any residual moisture which the carbon may have adsorbed during storage. One of the two twenty-five gram carbon samples was then heated under an inert nitrogen atmosphere for about 30 minutes at approximately 950° C. and then cooled to ambient temperature under nitrogen. A representative portion of the resultant carbon sample was then placed to a bed depth of one inch inside a glass tube having an inside diameter of one inch. The carbon bed was then contacted at ambient temperature and pressure with a gas stream flowing at about 2.3 liter per minute and containing 100 ppmv hydrogen sulfide, 20 vol % oxygen, and 2 vol % water, with the balance of the gas stream being nitrogen gas. The effluent from the carbon bed was monitored over time from the initial contact of the gas stream with the carbon bed until the hydrogen sulfide concentration in the bed effluent had reached 50 ppmv. For this sample the time required to reach 50 ppmv of hydrogen sulfide breakthrough in the bed effluent measured 554 minutes.

The remaining twenty-five gram carbon sample of the oven-dried carbon was deactivated by the method of the present invention in the following manner:

Approximately 15 mL of a 5 N aqueous hydrobromic acid solution was impregnated onto the oven-dried carbon, which was then allowed to stand for at least 24 hours in a closed glass container at ambient temperatures. Following this treatment, the container and its contents were directly oven-dried in air at about 150° C. and at atmospheric pressure for about 24 hours, and then cooled to ambient temperature in air. Following this treatment, the oven-dried, hydrobromic acid-treated carbon was calcined under nitrogen for about 30 minutes at approximately 950° C. and then cooled to ambient temperatures under nitrogen. A representative portion of the resultant carbon sample was then tested for the time to 50 ppmv hydrogen sulfide breakthrough by the same procedure described above. For this sample the time required to reach 50 ppmv of hydrogen sulfide breakthrough in the bed effluent measured 360 minutes.

Example 5. Four replicate twenty-five gram samples were prepared from an 8×30 mesh (U.S. Standard Series Sieves) Centaur activated carbon (Calgon Carbon Corporation, Pittsburgh, Pa.). These samples were oven-dried, as received, in air at about 150° C. for about 24 hours, and then cooled in air to ambient temperature, to remove any residual moisture which the carbon may have adsorbed during storage. Two of the four twenty-five gram carbon samples were then heated under an inert nitrogen atmosphere for about 30 minutes at approximately 950° C. and then cooled to ambient temperature under nitrogen. A representative portion of the combined resultant carbon sample was then placed to a bed depth of six inches inside a stainless steel tube having an inside diameter of about 0.9 inches. The carbon bed was then contacted at ambient pressure and 35° C. with a gas stream flowing at about 1.3 liters per minute and containing 5000 ppmv sulfur dioxide, 11 vol % oxygen, and 2 vol % water, with the balance of the gas stream being nitrogen gas. The effluent from the carbon bed was monitored over time from the initial contact of the gas stream with the carbon bed until the sulfur dioxide concentration in the bed effluent had reached 50% of the inlet value. For this sample the time required to reach 50% of sulfur dioxide breakthrough in the bed effluent measured 410 minutes.

The remaining twenty-five gram samples of the oven-dried carbon was deactivated by the method of the present invention in the following manner:

Approximately 15 mL of a 6 N aqueous hydrochloric acid solution was impregnated onto the oven-dried carbons, respectively, which were then allowed to stand for at least 24 hours in a closed glass container at ambient temperatures. Following this treatment, the containers and their contents were directly oven-dried in air at about 150° C. and at atmospheric pressure for about 24 hours, and then cooled to ambient temperature in air. Following this treatment, the oven-dried, hydrochloric acid-treated carbon were calcined under nitrogen for about 30 minutes at approximately 950° C. and then cooled to ambient temperatures under nitrogen. A representative portion of the combined resultant carbon sample was then tested for the time to 50% sulfur dioxide breakthrough by the same procedure described above. For this sample the time required to reach 50% of sulfur dioxide breakthrough in the bed effluent measured 186 minutes.

Example 6. Two replicate twenty-five gram portions of BCP Carbon, a commercially-available bituminous coal-based activated carbon manufactured by Calgon Carbon Corporation (Pittsburgh, Pa.), were oven-dried, as received, in air at about 150° C. for about 4 hours, and then cooled in air to ambient temperature, to remove any residual moisture which the carbon may have adsorbed during storage. To determine the inherent catalytic activity of the BCP carbon as received, one of the two portions of oven-dried carbon was calcined under nitrogen for about 30 minutes at about 950° C. and then cooled to ambient temperatures under nitrogen. The t-¾ time of the material resulting from this treatment was then measured by the method described in Example 1 of U.S. Pat. No. 5,470,748, the sole exception residing in the choice of buffer solution which in the present invention comprised 50 mL of a solution having a pH of approximately 12 and made by combining equal volumes of a 1 M $K_2HPO_4$ solution and a 1 M $K_3PO_4$ solution. When tested in this manner, the inherent t-¾ time of the carbon measured 11 minutes.

The remaining portion of the oven-dried BCP carbon was deactivated by the method of the present invention in the following manner:

Approximately 15 mL of a 10 N aqueous hydrochloric acid solution was impregnated onto the oven-dried carbon, which was then allowed to stand for about 24 hours in a closed glass container at ambient temperatures. Following this treatment, the container and its contents were directly oven-dried in air at about 150° C. and at atmospheric pressure for about 24 hours, and then cooled to ambient temperature in air. Following this treatment, the oven-dried, hydrochloric acid-treated carbon was calcined under nitrogen for about 30 minutes at about 950° C. and then cooled to ambient temperatures under nitrogen. The t-¾ time of the material resulting from this treatment was then measured by the method described above. When tested in this manner, the inherent t-¾ time of the deactivated carbon measured 198 minutes.

While presently preferred embodiments of the invention have been described in particularity, the invention may be otherwise embodied within the scope of the appended claims.

What is claimed is:

1. In a method for passing a liquid or gaseous process media over a carbonaceous char to obtain a process result, wherein said process media contains compounds which oxidize or disproportionate upon contact with said char, the improvement therein comprising passing said media over a carbonaceous char having an inherently reduced carbon catalytic activity to reduce or eliminate the chemical conversion of said oxidizable or disproportionable compounds.

2. An improved method as set forth in claim 1, wherein said oxidizable or disproportionable compound is the primary component of said process media.

3. An improved method as set forth in claim 1, wherein said liquid or gaseous process media is passed over said char to prevent the build-up of reaction products of said oxidizable or disproportionable compound on said char.

4. An improved method as set forth in claim 1 wherein the ash constituents of said char are removed or reduced in concentration prior to being exposed to acid or after being heated.

5. An improved method as set forth in claim 1, wherein said carbon catalytic activity results substantially from carbon constituents.

6. An improved method as set forth in claim 1, wherein said liquid or gaseous process media is passed over said char to preserve said oxidizable or disproportionable compounds.

7. An improved method as set forth in claim 1 wherein said carbonaceous char is exposed to an acid selected from the group consisting of hydrochloric acid, hydrobromic acid, hydoiodic acid and mixtures thereof, said acid-exposed char having a pH of less than about 5 and said acid-exposed char is heated to temperatures greater than 750° C., prior to contacting said media containing oxidizable or disproportionable compounds.

8. An improved method as set forth in claim 1, wherein said liquid or gaseous process media is passed over said char to purify said oxidizable or disproportionable compounds.

9. An improved method as set forth in claim 1, wherein said liquid or gaseous process media is passed over said char to adsorb, recover or remove said oxidizable or disproportionable compounds from said media.

10. In a physio-adsorption process for passing liquid or gaseous media over a carbonaceous char to obtain a process result, wherein said media contains oxidizable or disproportionable compounds that react with said char and produce contaminants or otherwise interfere with said physio-adsorption process, the improvement therein comprising passing said media over a carbonaceous char having an inherently reduced carbon catalytic activity to reduce or eliminate the chemical conversion of said oxidizable or disproportionable compounds thereby improving said process result.

11. An improved process as set forth in claim 10 wherein the ash constituents of said char are removed or reduced in concentration prior to being exposed to acid or after being heated.

12. An improved process as set forth in claim 10 wherein said carbonaceous char is exposed to an acid selected from the group consisting of hydrochloric acid, hydrobromic acid, hydoiodic acid and mixtures thereof, said acid-exposed char having a pH of less than about 5 and said acid-exposed char is heated to temperatures greater than 750° C., prior to contacting said media containing oxidizable or disproportionable compounds.

* * * * *